United States Patent

[11] 3,600,687

[72] Inventor George J. Dusheck, Jr.
Cinnaminson, N.J.
[21] Appl. No. 788,847
[22] Filed Jan. 3, 1969
[45] Patented Aug. 17, 1971
[73] Assignee The United States of America as represented by the Secretary of the Navy

[54] LOGIC ONE-SHOT
10 Claims, 2 Drawing Figs.
[52] U.S. Cl. .................................................. 328/63, 307/203
[51] Int. Cl. .................................................. H03k 19/00
[50] Field of Search ........................................... 307/203; 328/63

[56] References Cited
UNITED STATES PATENTS
3,314,013 4/1967 Dirac et al. .................... 328/63 X Primary Examiner—Richard A. Farley
Assistant Examiner—Daniel C. Kaufman
Attorneys—Edgar J. Brower and Henry Hansen ABSTRACT: A logic circuit for providing output signals and their complements at predetermined time intervals in response to the coincidence of received input signals. Separate signals are generated at both the receipt of the input signals and at a first predetermined time afterwards. The signals are terminated at a second predetermined time of later occurrence than the first time.

LOGIC ONE-SHOT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a logic one-shot device for use in a feature recognition system which processes transient submarine signals occurring in the presence of signallike noise and which further recognizes certain relatively invariant features exhibited by the submarine signals and not by the noise signals.

In the field of submarine detection and recognition, magnetic anomaly detection (MAD) devices and techniques have long been utilized. Basically, MAD is an airborne system employing magnetometer elements which sense the presence of a submerged submarine by measuring the small distortion in the earth's magnetic field caused thereby. This technique is an exacting one as the earth's magnetic field intensity may be on the order of 10,000 times stronger than that of the submarine. Additionally, the high altitudes of the aircraft, or more exactly the long slant ranges to the submarine, cause the signals from the submarine to virtually disappear into the noise background. This noise is derived from a multiplicity of sources as from, for example, the magnetometer sensing element itself, the magnetic and electrical equipments of the aircraft, large magnetic fields external to the aircraft such as geologic mineral deposits beneath the ocean floor, and other phenomena.

Due to these many noise sources and the distance between sensor and submarine, the submarine signal is either completely disguised by the noise such that it cannot be recognized therefrom or the noise signals themselves produce a response similar to the submarine signals such that false recognitions are effectuated.

Prior art systems incorporated a trained human operator who memorized features of patterns known to be representative of the signature of a submarine and whose function it was to visually recognize and extract these submarine signals from data displayed before him. The accuracy of such a technique was relatively low and varied with the individual operator. In addition, all of the operators fatigued with time thus further decreasing accuracy. The result was that many false alarms were indicated and many actual targets were entirely missed.

Thus there arose a need for a system capable of automatically and electronically recognizing and detecting, with a high degree of accuracy and reliability, submarine signals occurring in the presence of signallike noise.

SUMMARY OF THE INVENTION

Accordingly, it is the general purpose of the present invention to provide a logic one-shot for use in a feature recognition system which fulfills the need for a highly accurate, fully automatic submarine detection system. The recognition system operates upon incoming MAD signals containing both submarine signals and signallike noise, by abstracting the primary features or positive and negative slopes thereof, and by utilizing and processing these primary features to recognize and detect relatively invariant submarine signals therefrom.

The recognition system is divided into two major functional areas, the preprocessor system and the processor or signal recognition and detection system. The logic one-shot is utilized extensively in the processor system. The preprocessor receives MAD amplitude-time domain information (i.e., varying amplitude signals in the time domain) and passes them through a plurality of filter channels each having a different bandwidth and center frequency to provide time waveforms in the amplitude-time-frequency domain (i.e., signals varying in both amplitude and frequency but having the same time base as the received MAD signals). Thereafter, the preprocessor both prepares the amplitude-time-frequency domain primary signals for (slope) feature abstraction and actually performs the feature abstraction operation. The processor receives the primary feature abstracted signals and detects and recognizes therefrom the relative presence of invariant submarine signals or features as a function of degree of probability of detection and slant range from airborne feature recognition system to submerged submarine.

The processor comprises a plurality of recognition logic networks, each network including a range of logic circuits and each logic circuit per range being representative of a particular probability of detection as determined from empirical data, test results, and analysis. After the information is processed, if it satisfies the particular range criteria for the particular probability of detection for that range it is displayed thereby indicating a detected target (i.e., a submarine) with a degree of certainty equal to the degree of probability for the range.

The logic one-shot (LOS) generates accurate time windows which are used by the processor recognition logic to measure the temporal features of the input signal supplied thereto. The LOS comprises a plurality of integrated circuits and generates its windows with the aid of a clock and digital counters. A coincidence of input signals is necessary to enable the device. By slight modification, the LOS may be made retriggerable so that input signal recurrence restarts the device. These input signals may be derived from other logic components within the processor or from other LOS's.

Upon the coincidence of preselected inputs, the LOS is capable of providing two output signals and the complements thereof. These output signals are preset by means of the aforementioned clock and digital counters to begin upon enablement of the LOS and terminate a selectable time thereafter or, in the usual case, to begin a first selectable time after enablement and terminate a second selectable time thereafter. The beginning and ending of these signals corresponds to the initiation and termination of the time windows. Both the LOS and the retriggerable LOS may be disabled upon the receipt of an overload signal generated within the preprocessor.

DESCRIPTION OF THE PREFERRED EMBODIMENT

Figure 1:
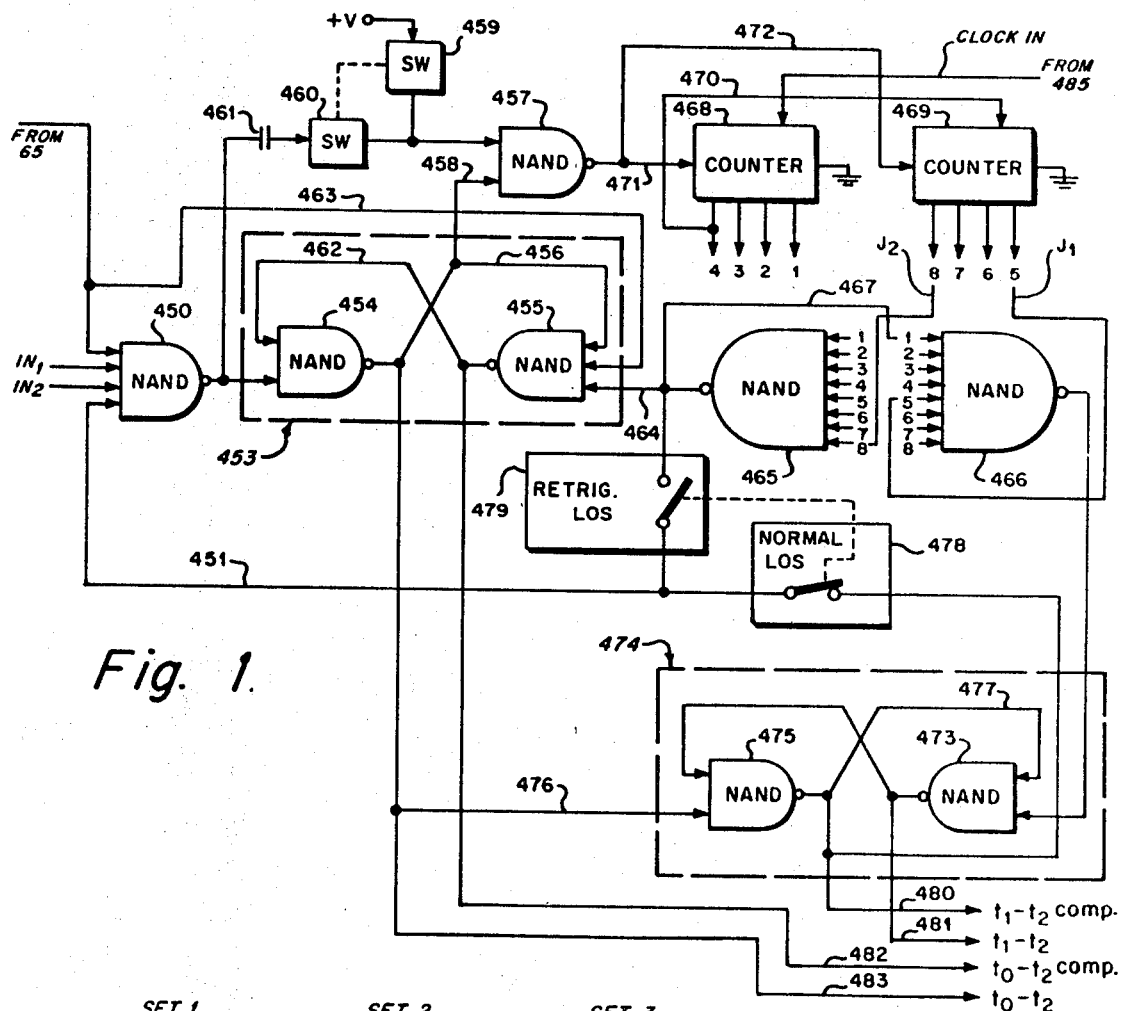
FIG. 1 is a schematic diagram of a logic one-shot used in the recognition logic.

The input element for the LOS or logic one-shot of FIG. 1 is a 4-input NAND gate 450. This gate receives the two inputs labeled $IN_1$ and $IN_2$ from either level detectors, transition detectors, or other logic one-shots. It is the coincidence of signals at these two inputs that enables the LOS. In addition, gate 450 receives a feedback input signal via line 451 and an input signal from overload logic 65. However, should an overload signal from overload logic 65 occur, the fourth input to the gate 450 goes low to disable the NAND gate and hence the LOS. NAND gate 450 is connected to a flip-flop 453 which includes NAND gates 454 and 455. The output of NAND gate 454 is connected via line 456 to an input of gate 455. Additionally, gate 454 is connected to an input of NAND gate 457 by the line 458. The second input of gate 457 is normally tied high through normally closed switch 459. However, during the retriggerable condition (to be discussed hereinafter) switch 459 is opened and normally open switch 460 is closed to connect the output of gate 450 through a capacitor 461 to the second input to the gate 457. These switches may be connected together (here shown by mechanical linkage) so that one is opened while the other thereof is closed.

A second input to gate 454 of flip-flop 453 is taken from the output of gate 455 via line 462. Also, gate 455 receives the overload signal from logic 65. Gate 455 also receives a reset signal via line 464 from an 8-input NAND gate 465. A second 8-input NAND gate 466 is also provided and may be inhibited by NAND gate 465 via line 467. Each of the NAND gates 465 and 466 at the various input terminals thereof may be connected or jumped to appropriate output terminals of series connected counters 468 and 469. Counter 468 receives a clock frequency input signal from the four stage binary counter 485, (not shown) and provides four outputs each of which is representative of a successive division of the input clock by a factor of two. Additionally, the fourth output is connected via line 470 to drive the counter 469. This counter's four outputs each successively divide this input signal by a factor of two. Counters 468 and 469 receive enabling signals via respectively the lines 471 and 472 from the output of NAND gate 457.

The output from NAND gate 466 feeds a NAND gate 473 of a second flip-flop 474. The output of gate 473 is connected to an input of a like gate 475 which receives a second input via the line 476 from the NAND gate 454 of flip-flop 453. Similarly, the output of NAND gate 475 serves as an input, via the line 477, to the NAND gate 473. A switch 478 is normally closed so that the output from gate 475 may be connected via the line 451 to feed back into the input of the LOS (more particularly to the input of gate 450). During the retriggerable operation, however, switch 478 is open and switch 479 is closed (switch 479 is open during normal operation) so that the output signal from gate 465 may flow through the line 451 to feed back onto the gate 450.

There are four output signals generatable by the LOS. These output signals occur within time periods denominated as $t_1 - t_2$ complement; $t_1 - t_2$; $t_0 - t_2$ complement; and $t_0 - t_2$, where $t_0$ is the start of a period; $t_1$ is the end of the first period; and $t_2$ is the end of a second time period. Thus the $t_0 - t_2$ period and its complement start at $t_0$ and end at the time $t_2$ and, the $t_1 - t_2$ period and its complement, which are delayed periods and which are the time windows, start at $t_1$ and end at $t_2$. The output signals are taken respectively from: the output of gate 475 via line 480, the output of gate 473 via line 481, the output of gate 455 via line 482, and the output of gate 454 via line 483.

Figure 2:
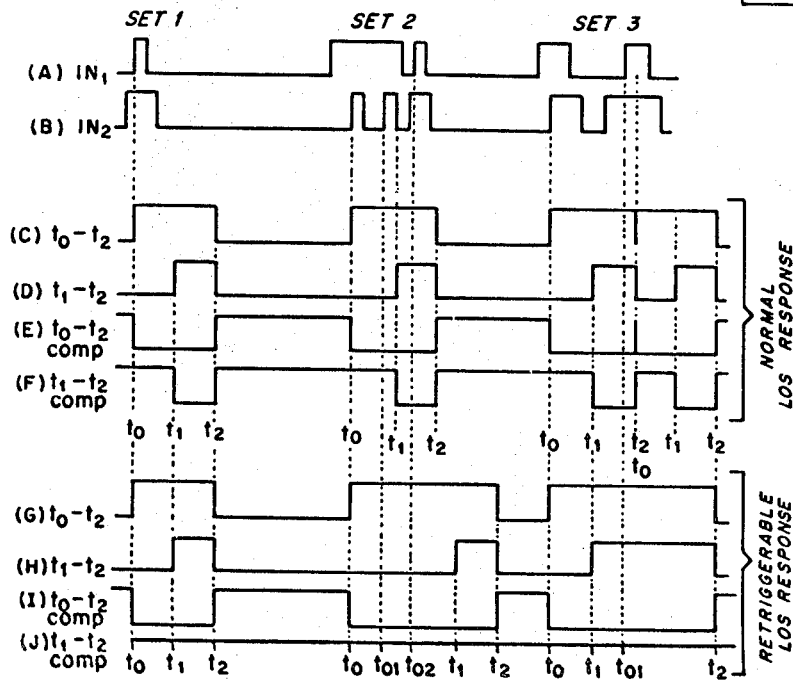
FIG. 2 is a timing diagram for the logic one-shot of FIG. 1.

The operation of the LOS will now be described with reference both to FIG. 1 and FIG. 2. FIG. 2 graphically illustrates in curves a and b three sets of typically representative input signals. Below these input signal sets are shown the four output periods of the normally operating LOS curves (curves c —f, inclusive). Below these are shown the retriggerable LOS output curves g —i, inclusive. As shown there is no $t_1 - t_2$ complement for the retriggerable LOS.

The input pulses of curves a and b may be derives from level detectors, transition detectors, and/or other LOS's. For the first set of input pulses, the start of the LOS ($t_0$) occurs as soon as both inputs are present (i.e., upon the coincidence of the two inputs). Output $t_0 - t_2$ (curve c and its complement, curve e) begin at $t_0$ and extend to time $t_2$ (this latter time being determined by 8-input NAND gate 465 to be discussed hereinafter. Output $t_1 - t_2$ (curve d and its complement curve f) start at time $t_1$, derive from 8-input NAND gate 466 to be discussed hereinafter, and also end at time $t_2$. The second set of inputs of curves a and b serve to illustrate that once the normal LOS starts its timing its periods variations in the input have no effect on its operation. From set 3 of curves a and b it is seen that if both input signals are present at time $t_2$ the outputs either remain high after the first time $t_0$ or are pulsed high or restarted as shown.

The retriggerable LOS is a slight modification of the normal LOS where the recurrence of both input signals restarts the logic circuit. This modification consists of the inclusion of the capacitor 461 (by the closing of switch 460 and the opening of switch 459) and the closing of switch 479 and opening of switch 478, as noted heretofore. There are three outputs present: $t_0 - t_2$; $t_1 - t_2$, and $t_0 - t_2$ complement.

For the first set of input signals (curves a and b ) the retriggerable LOS output is the same as for the normally connected LOS. With regard to set 2 (i.e., changes in the inputs after the LOS has started) the retriggerable LOS outputs are different from those of the normal LOS. More particularly, for the set 2 example the start of the first pulse curve b initiates time $t_0$ and when the pulse of curve b goes low it has no effect on the timing of the LOS. However, when this pulse again goes high, with the first input of curve a remaining high, the LOS is retriggerable at $t_{01}$. When the pulse of curve b goes high the third time nothing happens because the pulse of curve a has gone low. However, when the pulse of curve a again goes high (with the pulse of curve b remaining high) the LOS is again restarted at $t_{02}$. Thereafter the output periods are timed normally.

Set 3 of the input signals of curves a and b demonstrates the results of retriggering after the time $t_1$. At $t_{01}$, the $t_0 - t_2$ period (curve g) and its complement (curve i) are restarted. The $t_1 - t_2$ period (curve h) does not return to the low state but its timing is restarted. All outputs end at $t_2$.

The normal LOS operation will now be explained. For purposes of illustration a time window 0.2 to 1.6 seconds will be generated. Whenever all inputs to the gate 450 go high the output thereof will go low to feed gate 454 of flip-flop 453 thereby setting it. $t_0$ is taken at this time. Additionally, the gate 457 is enabled (since it is tied high) and goes low to enable counters 468 and 469 to count the clock frequency. Gate 454 also feeds (via line 476) the gate 475 of flip-flop 474. Whenever this second flip-flop 474 receives this signal from the first flip-flop 453, the second flip-flop 474 is cleared to recognize $t_1$ from 8-input AND gate 466. Thus, for example, to generate the time window of 0.2 to 1.6 seconds and for purposes of illustration if an 80 pulse per second clock is assumed (as derived from binary counter 485 and appropriate flip-flop circuits, not shown) it is seen that for 0.2 second $t_1$ time (16 pulses) it is necessary to jump the fifth output of counter 469 (via jumper $J_1$) to one of the inputs (input 5 for convenience) of AND gate 466. Additionally, a $t_2$ of 1.6 seconds (128 pulses) is derived by jumping the eight output of counter 469 (via jumper $J_2$) to the eighth input of AND gate 465. Of course, it is to be understood that the above jumper connections are illustrative only. To generate the various other LOS time windows other jumper connections and/or combinations are necessary. Generally stated, the desired count, hence period, is determined by the counter outputs jumped to the gates 465 and 466. Gate 466 is used to detect the $t_1$ and gate 465 is used to detect $t_2$.

When the $t_1$ count is reached (since all the jumped inputs to gate 466 are high) the gate 466 will go low thereby setting the second flip-flop 474. Flip-flop 474 drives the $t_1 - t_2$ period outputs (via lines 480 and 481) to their $t_1$ level. Later in time the $t_2$ count will be reached (all the jumped inputs to gate 465 will go high) and the output thereof will go low. The low output of the gate 465 locks the gate 466 (via line 467) from recognizing a false count so that the second flip-flop 474 can be reset. Additionally, this output from gate 465 is fed to the first flip-flop 453 to reset it. The reset first flip-flop 453 drives the gate 457 which stops and zeros the counters 468 and 469. Additionally, the reset flip-flop 453 ends the period of both $t_0 - t_2$ outputs (lines 482 and 483) and resets the second flip-flop (via line 476) which in turn ends the period of both $t_1 - t_2$ outputs (lines 480 and 481).

In the retriggerable LOS the switch 479 is closed while the switch 478 is open and the capacitor 461 is placed in the circuit by closing of switch 460 and the opening of switch 469. In this case each time all the inputs to gate 450 go high and the output thereof goes low a negative transient signal is coupled through the capacitor 461 to the input of gate 457 thereby causing the output thereof to go high thus resetting the counters 468 and 469 to zero. This transient is sent only to the counters so after its passage the LOS continues counting. However, the count starts from zero. The closure of switch 479 and the opening of switch 478 permits the recognition of the coincidence of inputs up to time $t_2$ (as taken from gate 465) since the gate 450 is inhibited from recognizing the coincidence of inputs after $t_1$ when the switch 478 is utilized.

The fourth input to the input gate 450 is the stop signal. The overload signals generated in the preprocessor (not shown) from the overload logic 65 are sent to their respective range recognition logic where they are process and fed to all the LOS's in that range logic (accordingly in FIG. 13 each of the LOS's therein are provided with.) When the overload condition exists the stop signal falls to the zero level so that an input to the gate 450 goes low disabling the LOS. The stop signal is also fed to the gate 455 (via line 463) where it resets the first flip-flop 453 thereby stopping and resetting the counters 468 and 469 through the gate 457.

In order to generate the most accurate time periods five clock frequencies have been made available for use by the various LOS's in the recognition logic. These frequencies are 160, 80, 40, 20, and 10 cycles per second. The highest frequency clock capable of generating the desired period is chosen since the accuracy of the LOS is basically one count of the clock.

Obviously many modifications and variations of the present invention are possible in the light of the above teachings. It is therefore to be understood that within the scope of the appended claims the invention may be practiced otherwise than as specifically described.

What is claimed is:

1. A logic circuit providing a digital signal during time windows generated thereby comprising:
    counter means counting a received preselected pulse frequency for providing a plurality of output pulse frequencies fractionally related to said received pulse frequency;
    first means operatively connected to said counter means for providing an enabling signal thereto; and
    second means operatively connected to said first means and said counter means for generating a time window and providing a digital output signal during said time window responsive to preselected ones of said output pulse frequencies.

2. A logic circuit comprising:
    enabling means receiving a plurality of digital signals of low and high binary levels for providing a low binary level enabling signal upon coincidence of the high levels of said received signals;
    counter means receiving said enabling signal and pulses of preselected frequency for providing first and second high binary level output signals at predetermined time intervals after said enabling signal; and
    generating means operatively connected to received said enabling signal and said first and second output signals for providing a high binary level output signals during the time interval between said counter means first and second output signals.

3. A logic circuit according to claim 2 wherein said enabling means comprises:
    first logic gage means for providing a low binary level output signal in response to the receipt and detection of the coincidence of a plurality of high binary level input signals;
    first flip-flop means operatively connected to said first logic gate means for providing a high binary level output signal in response to the receipt of said first logic gate means output signal; and
    second logic gate means operatively connected to said first logic gate means and said first flip-flop means for providing said enabling signal to said counter means in response to said first logic gate means and said first flip-flop means output signals.

4. A logic circuit according to claim 3 wherein said generating means comprises:
    third logic gate means having a plurality of input terminals operatively connected to said counter means for providing a low binary level output signal upon the receipt said counter means first output signal;
    second flip-flop means operatively connected to said first flip-flop means and said third logic gate means for generating a high binary level output signal upon the receipt of said first flip-flop and said third logic gate output signals; and
    fourth logic gate means having a plurality of inputs operatively connected to said counter means for providing a low binary level output signal to said first flip-flop means and a first disabling low binary level signal to said third logic gate means in response to said counter means second output signal.

5. A logic circuit according to claim 4 wherein:
    said first flip-flop means for further providing a low level disabling signal to said second logic gate means and to said second flip-flop means to terminate said second flip-flop means output signal in response to said fourth logic gate means output signal; and
    said second logic gate means for further providing a high binary level reset signal to said counter means in response to said first flip-flop low level disabling signal.

6. A logic circuit according to claim 5 further comprising:
    first switch means operatively connected between said second flip-flop means and said first logic gate means for providing a path whereby a feedback signal from said second flip-flop means is supplied to said first logic gate means.

7. A logic circuit according to claim 6 wherein said counter means comprises:
    a first binary counter receiving said preselected pulse frequency and having at least four output terminals; and
    a second binary counter serially connected with said first counter and having at least four output terminals.

8. A logic circuit according to claim 7 further comprising:
    retriggering means operatively interposed between the output of said first logic gate means and the input of said second logic gate means for providing a time limited signal to said second logic gate means upon receipt of a high level binary output signal from said first logic gate means; and
    second switch means operatively connected between said fourth logic gate means and said first logic gate means for providing a feedback path for a retrigger signal from said fourth logic gate means to said first logic gate means when said second switch means is closed and said first switch means is open.

9. A logic circuit according to claim 8 wherein:
    said first, second, third, and fourth logic gate means comprise NAND gates adapted to provide low binary level output signals upon the coincidence of high binary level input signals supplied thereto.

10. A logic circuit according to claim 9 wherein:
    said first flip-flop means comprises a first NAND gate and a second NAND gate, the output of said first NAND gate operatively connected to the input of said second NAND gate and the output of said second NAND gate operatively connected to the input of said first NAND gate; and
    said second flip-flop means comprises a third NAND gate and a fourth NAND gate, the output of said third NAND gate operatively connected to the input of said fourth NAND gate and the output of said fourth NAND gate operatively connected to the input of said third NAND gate.